US010127071B2

(12) United States Patent
Paolino et al.

(10) Patent No.: US 10,127,071 B2
(45) Date of Patent: Nov. 13, 2018

(54) VIRTUAL SWITCH FOR MULTI-COMPARTMENT MIXED CRITICAL NETWORK COMMUNICATIONS

(71) Applicant: Virtual Open Systems, Grenoble (FR)

(72) Inventors: Michele Paolino, Grenoble (FR); Kevin Chappuis, Grenoble (FR); Salvatore Daniele Raho, Grenoble (FR)

(73) Assignee: Virtual Open Systems, Grenoble (FR)

( * ) Notice: Subject to any disclaimer, the term of this patent is extended or adjusted under 35 U.S.C. 154(b) by 34 days.

(21) Appl. No.: 15/625,052

(22) Filed: Jun. 16, 2017

(65) Prior Publication Data
US 2017/0371698 A1   Dec. 28, 2017

(30) Foreign Application Priority Data

Jun. 28, 2016   (EP) .................................. 16305784

(51) Int. Cl.
G06F 9/455 (2018.01)
H04L 12/931 (2013.01)
G06F 9/50 (2006.01)
H04L 29/06 (2006.01)

(52) U.S. Cl.
CPC ........ *G06F 9/45558* (2013.01); *G06F 9/5005* (2013.01); *H04L 49/70* (2013.01); *H04L 67/38* (2013.01); *H04L 69/12* (2013.01); *H04L 69/18* (2013.01); *G06F 2009/45575* (2013.01); *G06F 2009/45595* (2013.01)

(58) Field of Classification Search
CPC .................................................. G06F 2212/65
See application file for complete search history.

(56) References Cited

U.S. PATENT DOCUMENTS

| 9,906,401 | B1* | 2/2018 | Rao ......................... H04L 41/12 |
| 2010/0217916 | A1 | 8/2010 | Gao et al. |
| 2011/0161620 | A1* | 6/2011 | Kaminski ........... G06F 12/1009 711/207 |
| 2013/0294231 | A1 | 11/2013 | Nodir et al. |
| 2014/0068608 | A1* | 3/2014 | Kulkarni ............. G06F 9/45558 718/1 |
| 2017/0286142 | A1* | 10/2017 | Palermo .............. G06F 9/45558 |

FOREIGN PATENT DOCUMENTS

| EP | 3001616 A2 | 3/2016 |
| WO | 2008005793 A2 | 1/2008 |

* cited by examiner

*Primary Examiner* — Jae U Jeon
(74) *Attorney, Agent, or Firm* — The Noblitt Group, PLLC (57) ABSTRACT

The invention concerns a multi-core processing system comprising: a first input/output interface (312) configured to transmit data over a first network (313) based on a first network protocol; a second input/output interface (314) configured to transmit data over a second network (315) based on a second network protocol; a plurality of processing cores; and one or more memory devices storing software enabling virtual processing resources of the plurality of processing cores and virtual memory to be assigned to support: a first compartment (303) implementing one or more first virtual machines; a second compartment (304) implementing one or more second virtual machines; and a programmable virtual switch (302) configured to provide an interface between the first and second virtual machines and the first and second input/output interfaces (312, 314).

9 Claims, 5 Drawing Sheets

VIRTUAL SWITCH FOR MULTI-COMPARTMENT MIXED CRITICAL NETWORK COMMUNICATIONS

The work leading to this invention has received funding from the European Union Horizon 2020 Programme H2020/2014-2020 under grant agreements n° 645119 (TAPPS) and n° 761508 (5GCity).

FIELD

The present disclosure relates to the field of compute nodes providing an execution environment for virtual machines, and in particular to a virtual switch for network communications.

BACKGROUND

A compute node is a combination of hardware resources, including one or more processing devices, memory and networking circuits, as well as a software module known as a hypervisor. The hypervisor is used to support a plurality of virtual machines, each for example being associated with a different operating system. A compute node provides a single execution environment in which more than one virtual machine may be executed. It has been proposed to use the hypervisor of a compute node to virtualise both an RTOS (real-time operating system) and a GPOS (general purpose operating system) on a same platform.

Automotive embedded systems today comprise hundreds of distributed single core ECUs (Electronic Control Units), each realising an electronic function within the vehicle. These units are connected via a network generally implemented by a controller area network (CAN), or CAN-FD (Controller Area Network with flexible data rate), or a network known as FlexRay. However, such a solution has reached its limits in terms of bandwidth and scalability. Furthermore, functions termed in the industry as "infotainment" functions, as well as advanced driver assistance systems (ADAS), add an extraordinary amount of streaming data and control signals, which cannot be handled by such networks alone. As a consequence, there is a general move towards other network protocols, such as Ethernet, which offer significantly larger frame sizes when compared to CAN. This is for example discussed in more detail in the publication by D. Thiele et al. entitled "Formal timing analysis of CAN-to-Ethernet gateway strategies in automotive networks", Real-Time Syst (2016) 52:88-112.

Furthermore, the increasing number of functions required by connected cars is resulting in a rise in the number of single-core ECUs that are required, increasing power and space consumption costs. It has been proposed to apply virtualisation techniques to address this issue, by using virtualization techniques to implement multiple ECUs on a multi-core processor. For example, the publication by C. Herber et al. entitled "HW/SW Trade-offs in I/O Virtualization for Control Area Networks", DAC' 15, Jun. 7-11, 2015, San Francisco, describes such a proposal.

However, there are technical difficulties in providing a virtualized computing system for applications such as automotive embedded systems while permitting secure and rapid communications between the various components.

SUMMARY

It is an aim of embodiments of the present description to at least partially address one or more difficulties in the prior art.

According to one aspect, there is provided a multi-core processing system comprising: a first input/output interface configured to transmit data over a first network based on a first network protocol; a second input/output interface configured to transmit data over a second network based on a second network protocol; a plurality of processing cores; and one or more memory devices storing software enabling virtual processing resources of the plurality of processing cores and virtual memory to be assigned to support: a first compartment implementing one or more first virtual machines; a second compartment implementing one or more second virtual machines; and a programmable virtual switch configured to provide an interface between the first and second virtual machines and the first and second input/output interfaces.

According to one embodiment, the multi-core processing system further comprises one or more hardware accelerators coupled to the first and second input/output interfaces, wherein the programmable virtual switch is further configured to dynamically allocate the one or more hardware accelerators for use by the first or second virtual machines.

According to one embodiment, the programmable virtual switch comprises a shared memory permitting communications between the first and second virtual machines.

According to one embodiment, the shared memory comprises a common area for the first and second virtual machines to read and write data packets.

According to one embodiment, the shared memory comprises a plurality of sub-regions, a different sub-region being associated with each of the first and second virtual machines, wherein the programmable virtual switch is configured to deny read/write access to at least one of said sub-regions by at least one of said first and second virtual machines.

According to one embodiment, the programmable virtual switch comprises: a first compartment switch providing an interface between the first virtual machines and the first input/output interface and/or the one or more hardware accelerators; a second compartment switch providing an interface between the second virtual machines and the second input/output interface and/or the one or more hardware accelerators; wherein the first and second compartment switches are configured to communicate via the shared memory.

According to one embodiment, the programmable virtual switch is configured such that: the first compartment switch is capable of accessing the shared memory only during the first compartment execution; and the second compartment switch is capable of accessing the shared memory only during the second compartment execution.

According to one embodiment, the programmable virtual switch further comprises a security manager configured to perform packet authentication of data packets transmitted and/or received by the first and/or second virtual machines. For example, the security manager uses one of more hardware accelerators.

According to one embodiment, the virtual switch is adapted to write a special authorization code to one or more registers associated with the one or more processing cores, the special authorization code indicating that the packet transmission is initiated by the virtual switch, wherein a monitor layer is configured to authorize the packet transmission based on the special authorization code.

According to one embodiment, the first network is one or more of: an Ethernet network; an AVB network; an MOST (media oriented systems transport) network, and the second network is one or more of: a CAN; and a CAN-FD (controlled area network with flexible data rate).

According to one aspect, there is provided a method of communication comprising: providing a virtual processing system comprising a plurality of processing cores, and one or more memory devices storing software enabling virtual processing resources of the plurality of processing cores and virtual memory to be assigned to support a first compartment implementing one or more first virtual machines, a second compartment implementing one or more second virtual machines, and a programmable virtual switch; routing, by the programmable virtual switch, first data from one of the first and second virtual machines to one or more of: another of the first and second virtual machines; a first input/output interface configured to transmit data over a first network based on a first network protocol; and a second input/output interface configured to transmit data over a second network based on a second network protocol.

According to one embodiment, the first data is routed to the first or second input/output interface via one or more hardware accelerators, the method further comprising allocating, by the programmable virtual switch, the one or more hardware accelerators for transmitting data over the first or second network.

According to one embodiment, the first data is routed from one of the first virtual machines to one of the second virtual machines via a shared memory.

According to one embodiment, the first data is routed from one of the first virtual machines to one of the second virtual machines via: a first compartment switch accessible by the first virtual machines; a second compartment switch accessible by the second virtual machines; and the shared memory accessible by the first and second compartment switches.

According to a further aspect, there is provided a computer readable medium storing computing instructions adapted to implement, when executed by a processing device, the above method.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
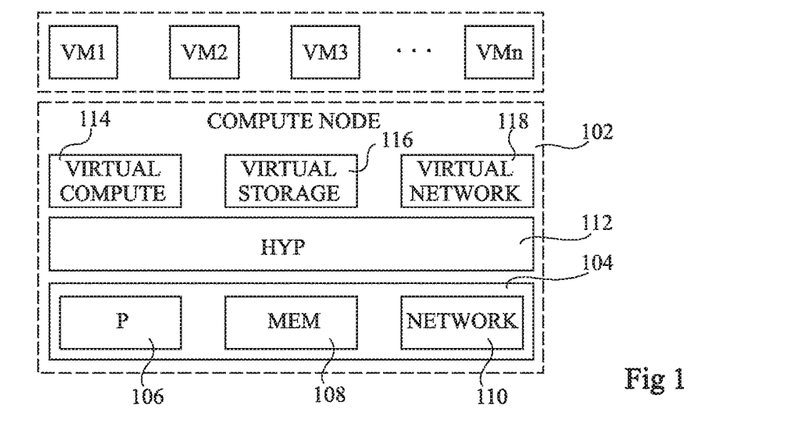
FIG. 1 schematically illustrates a compute node supporting a plurality of virtual machines according to an example embodiment.

FIG. 1 schematically illustrates a compute node 102 supporting a plurality of virtual machines VM1 to VMn according to an example embodiment. As illustrated, the compute node 102 for example comprises hardware components 104, including one or more processors 106, memory devices 108, and networking circuits 110. Furthermore, the memory devices 108 for example store software including an operating system providing the hypervisor 112, which supports and enables the virtual machines to execute. Indeed, the hypervisor for example supports a virtual compute module 114, which assigns processing functions to the virtual machines, a virtual storage module 116, which assigns memory space to the virtual machines, and a virtual network module 118, which enables the virtual machines to access the network hardware 110.

Figure 2:
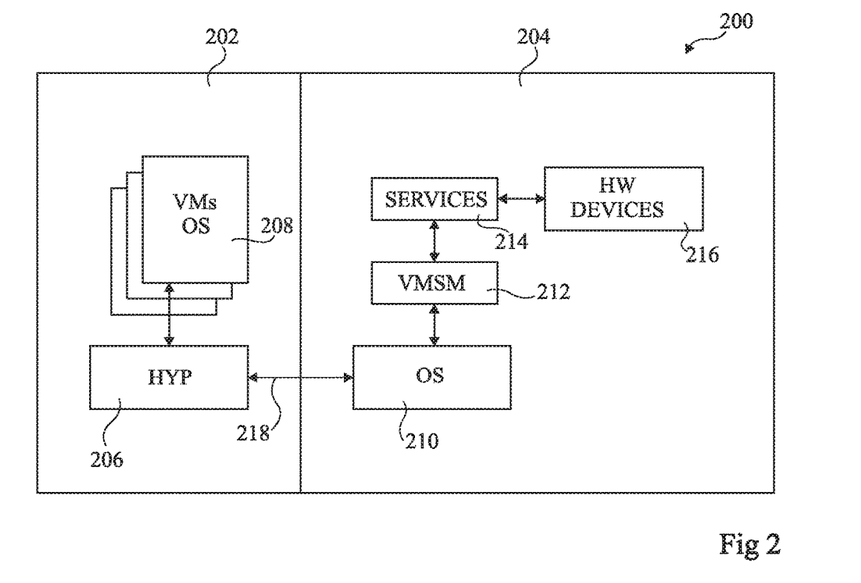
FIG. 2 schematically illustrates a dual-compartment compute node according to an example embodiment.

FIG. 2 schematically illustrates a dual-compartment compute node 200 according to an example embodiment. A similar compute node is for example described in more detail in the PCT application assigned the application filing number PCT/EP2016/055951 (hereafter PCT'951) filed on Mar. 18, 2016 in the name present applicant, the contents of which is hereby incorporated by reference to the extent permitted by the law. The dual-compartment compute node 200 is for example implemented based on the hardware of FIG. 1, with some further hardware devices and a hardware partition as will be described in more detail below.

The dual-compartment compute node 200 comprises a compartment 202, which supports a plurality of virtual machines, and a compartment 204, which for example provides a protected execution environment for certain services such as real time capabilities, security applications, hardware acceleration devices, or the like.

In particular, the compartment 202 for example comprises software implementing the hypervisor 206, and the plurality of virtual machines 208, each for example being associated with a different operating system. The hypervisor 206 and the virtual machines 208 are for example implemented using a general purpose operating system (GPOS), such as Linux KVM (Kernel-based Virtual Machine).

The compartment 204 for example comprises an operating system 210, which will be referred to herein as a "full-fledged" operating system, implying that it for example permits a standard instruction set, providing a broad range of capabilities. This is for example a real-time operating system (RTOS). The operating system 210 for example communicates with a virtual machine services manager 212, which is a software module that controls an interface between the services provided by the service compartment and the virtual machines 208 of the VM compartment. For example, the virtual machine services manager 212 stores data related to the services, the virtual machines, and the hypervisor, and permits interaction between these elements.

The services are for example represented by a block 214, which comprises software executing the real-time functionality. This may also be coupled to one or more hardware devices 216 including one or more hardware accelerators, one or more FPGAs (field programmable gate arrays) and/or one or more ASICs (application specific integrated circuits), such as DSPs (digital signal processors), GPUs (graphics processing units), etc. In some embodiments, the services may further comprise a virtual trusted platform module (vTPM), as described in more detail in US patent application published as US2012/0030676, the contents of which is hereby incorporated by reference to the extent permitted by the law, and as described in the publication entitled "vTPM: Virtualizing the Trusted Platform Module", S. Berger et al., IBM research division, RC23879 (W0602-126) Feb. 14, 2006, the contents of which is hereby incorporated by reference to the extent permitted by the law.

A communication link 218 between the compartments 202, 204, for example between the hypervisor 206 and the operating system 210, is for example protected by a hardware partition, which provides access control between the compartments. For example, the hardware partition is implemented using a solution known in the art as the "ARM TrustZone" (the name ARM TrustZone may correspond to one or more registered trademarks). Such a solution is for example described in more detail in US patent application published as US20130031374, the contents of which is hereby incorporated by reference to the extent permitted by the law.

The hardware partition present between the two environments provided by the compartments 202, 204 is for example implemented by using a set of system signals over a system bus to specify, for each transaction, the intended compartment. These signals are also for example used to specify the peripheral address space, such that the use of devices can be restricted to one of the components 202, 204. Additionally, each cache line could be tagged with an identifier associated with the compartment to be used.

Furthermore, communications between the compartments 202, 204 is for example made using a specific instruction set extension, which could be a single instruction or a set of instructions executed by a VM, causing a jump to be performed. Furthermore, data may be transferred between the two environments 202, 204 using a shared memory.

In some embodiments, shared memory accesses are rendered secure using a mandatory access control (MAC) technology such as SELinux, AppArmor, SMACK, etc.

In alternative embodiments, access control tags are used for the various hardware resources for implementing access control. For example, memory, memory mapped devices, and system bus messages of the compute node 102 include tags restricting access to these components. A further example of implementation of the hardware partition is for example described in PCT'951.

Thus the compute node of FIG. 2 provides two distinct execution environments, the compartment 204 for example corresponding to a "secure" operating environment isolated from the "normal" operating environment by the compartment 202. While in some embodiments these two environments could run concurrently on a same core, in alternative embodiments, the execution could be split between different cores.

Figure 3:
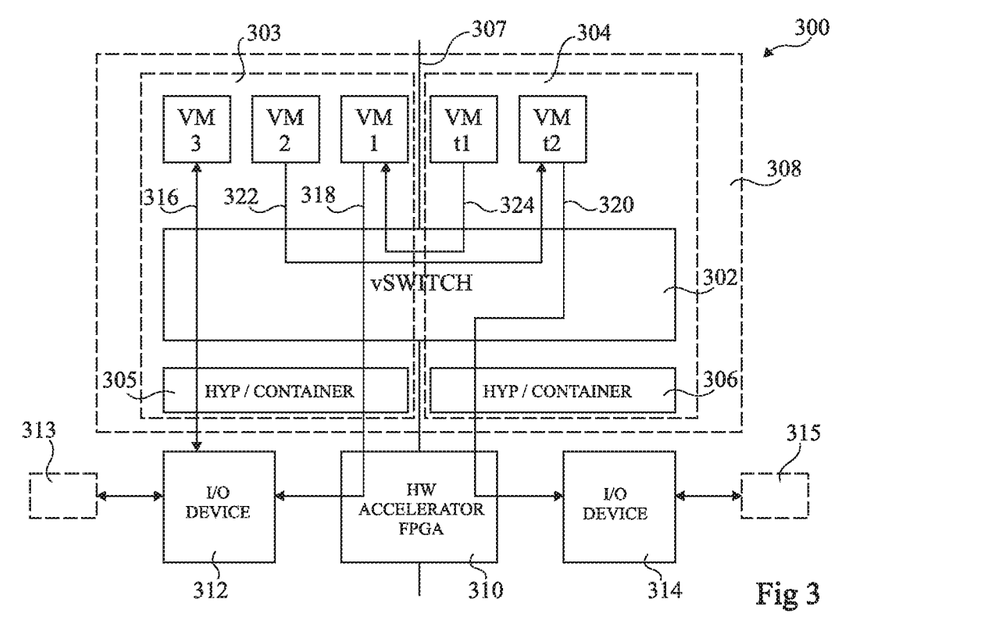
FIG. 3 schematically illustrates a multi-core processing system comprising a virtual switch according to an example embodiment of the present disclosure.

FIG. 3 schematically illustrates a multi-core processing system 300 according to an example embodiment.

The system 300 for example comprises a virtual switch (vSWITCH) 302 that provides an interface between compartments 303 and 304 of a compute node. The compartments 303 and 304 are for example similar to the compartments 202 and 204 of the compute node of FIG. 2, and the virtual switch, along with a monitor layer (not represented in FIG. 3), for example implements a hardware partition between the compartments 303, 304 in a similar manner to the hardware partition 218 of FIG. 2. This hardware partition is represented by a line 307 in FIG. 3.

The compartment 303 for example implements one or more virtual machines, and in the example of FIG. 3 there are three such virtual machines labelled VM1, VM2 and VM3. The compartment 303 is for example associated with a hypervisor and/or container system (HYP/CONTAINER) 305. As known by those skilled in the art, a container is a special type of virtual machine, which is for example of relatively low complexity. The hypervisor/container 305 is for example able to enable the concurrent execution of different virtual machines and/or containers. An example implementation of a hypervisor is by a KVM (kernel based virtual machine), and an example implementation of a container system is by a system known in the art as a Docker (the name "Docker" may correspond to a registered trademark). The compartment 304 for example also implements one or more virtual machines, and in the example of FIG. 3 there are two such virtual machines VM t1 and VM t2. The compartment 304 is for example associated with a hypervisor and/or container (HYP/CONTAINER) 306. The virtual switch 302, compartments 303, 304, and hypervisors 305, 306 form a compute node 308 for example implemented in software by the hardware elements of FIG. 1.

In some embodiments, a circuit 310 comprising one or more hardware accelerators is coupled to the compute node 308, and in particular to the virtual switch 302. The hardware accelerator circuit 310 is for example implemented by one or more ASICs (application specific integrated circuits) or by one or more FPGAs (field programmable gate arrays).

An input/output device (I/O DEVICE) 312 is for example coupled to the compute node 308 and/or to the hardware accelerators 310, and for example provides an interface with a network 313. Similarly, an input/output device (I/O DEVICE) 314 is for example coupled to the compute node 308 and/or to the hardware accelerators 310, and for example provides an interface with a network 315. The networks 313 and 315 are for example networks based on different bus protocols from each other. For example, in one embodiment, the multi-core processing system 300 is an automotive embedded system, and the network 313 is an Ethernet, AVB (audio video bridge) or MOST (media oriented systems transport) network, and the network 315 is a CAN (controlled area network) or CAN-FD (CAN-flexible data rate). Furthermore, in some embodiments, the virtual machines of the compartment 303 are configured to communicate based on the same bus protocol as that of the network 313, and the virtual machines of the compartment 304 are configured to communicate based on the same bus protocol as that of the network 315.

In some embodiments, the virtual switch 302 is for example configured to dynamically allocate hardware acceleration resources to the virtual machines of the compartments 303, 304. For example, an IPSEC (internet protocol security) accelerator is implemented in the hardware accelerator circuit 310, and is allocated to encrypt communications with trusted destinations. The encryption key is for example stored in one or the two compartments and is not accessible by the other. For example, the compartment 304 may correspond to a trusted compartment, which stores the encryption key such that only the virtual machines of the compartment 304 can instruct the IPSEC accelerator to decrypt communications. In some embodiments, the IPSEC accelerator can also be used by one or more of the virtual machines of the compartment 303, allowing secure communications between the virtual machines of the compartments 303, 304, or with the outside world via the devices 312 or 314. Advantageously, the virtual switch 302 is programmable to allow one or more hardware accelerators of the circuit 310 to be allocated when packets are passed from a virtual machine of one compartment to a virtual machine of the other compartment. For example, a packet could be transmitted from the virtual machine VM1 to the virtual machine VM t1 via the hardware accelerator circuit 310, which is allocated by the virtual switch 302 and applies an encryption operation to the packet. As a further example, a packet could be transmitted from the virtual machine VM1 to the input/output device 312 or 314 via the hardware accelerator circuit 310, which is allocated by the virtual switch 302 and applies a decryption operation to the packet.

As represented by an arrow 316 in FIG. 3, in some cases the virtual switch 302 is configured to route data packets to be transmitted from a virtual machine of the compartment 303 to the network 313 directly to the input/output device 312. While not represented in FIG. 3, a virtual machine of the compartment 304 could similarly transmit a packet directly to the input/output interface 314. Alternatively, as represented by arrows 318 and 320, the virtual switch 302 may be configured to route certain packets from a virtual machine of the compartment 303 or 304 to one of the hardware accelerators 310, which for example perform operations on the data packets before transmitting them over the corresponding network 313, 315. For example, one of the hardware accelerators 310 may be adapted to provide communication protocol conversion, to convert from the protocol of network 313 to the protocol of network 315, and another of the hardware accelerators 310 may be adapted to perform the opposite protocol conversion.

For example, in the automotive example, one or more hardware accelerators may be provided for performing one or more of the following bus protocol conversions:
 CAN to Ethernet;
 Ethernet to CAN;
 MOST to Ethernet;
 Ethernet to MOST;
 AVB to Ethernet; and
 Ethernet to AVB.
Furthermore, one or more of the hardware accelerators 310 may additionally be configured to generate time stamps, to generate time triggered and/or event triggered networking extensions, e.g. TTethernet (time-triggered Ethernet—the name "TTethernet" may correspond to a registered trademark), etc.

As represented by arrows 322 and 324 in FIG. 3, the virtual switch 302 also for example permits communications between the virtual machines of one compartment with the virtual machines of another compartment, as will be described in more detail below with reference to FIG. 4A.

Figure 4A:
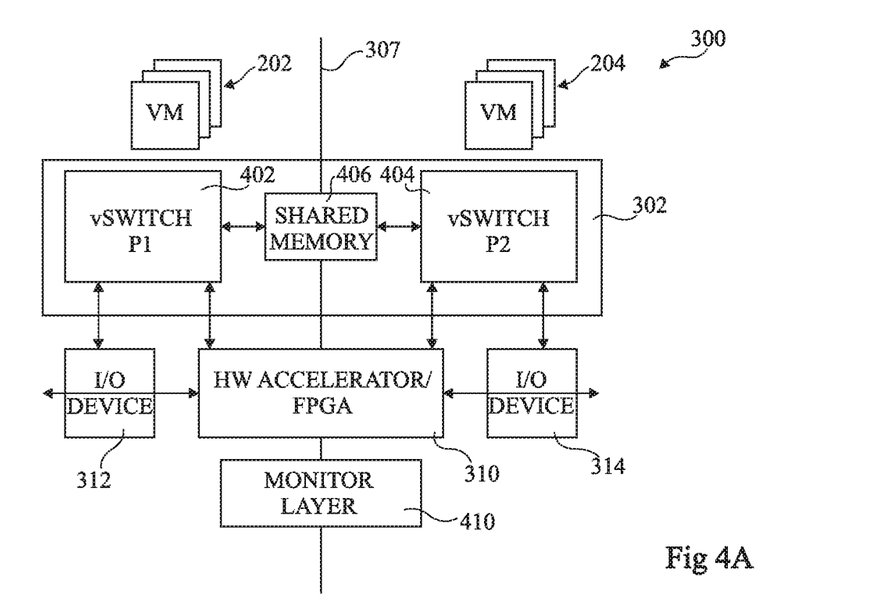
FIG. 4A schematically illustrates the multi-core processing system of FIG. 3 in more detail according to an example embodiment of the present disclosure.

FIG. 4A schematically illustrates the multi-core processing system 300 in more detail according to an example embodiment. In particular, the virtual switch 302 is illustrated in more detail as comprising sub-switches 402 and 404 (vSWITCH P1, vSWITCH P2) respectively associated with the compartments 303 and 304, and a shared memory 406 shared between the compartments 303 and 304. Thanks to the shared memory 406, the virtual switch 302 for example assures the role of a communications bridge between the compartments 303, 304, allowing information to be exchanged using different bus protocols. The sub-switches 402 and 404 are for example modular and programmable. These sub-switches are for example adapted to run different software modules to implement different functions. For example, a software module of either or both of the sub-switches 402, 404 is adapted to perform protocol conversion. The software module is for example a C or Lua programming language file, and in some embodiments, the conversion is made at least partially using one or more hardware accelerators or an FPGA of the hardware accelerator circuit 310. In some embodiments, prior to using an FPGA of the circuit 310 to perform a conversion, it is programmed by an appropriate bitstream provided for example by one of the sub-switches 402, 404 of the virtual switch 302.

In some embodiments, the programmable virtual switch is configured such that the sub-switch 402 is capable of accessing the shared memory 406 only during the compartment 303 execution and the sub-switch switch 404 is capable of accessing the shared memory only during the compartment 304 execution. In this way, partitioning between the compartments 303, 304 is assured by the virtual switch 302. In some embodiments, one or more processing cores implementing the compute node are configured by software to perform compartment 303 or compartment 304 execution, but not execution of both compartments at the same time.

The shared memory 406 for example comprises one or more memory zones accessible by both the compartments 303 and 304. For example, the shared memory 406 functions as one or more FIFO (first-in-first-out) buffers for data transmission between the compartments. For example, in one embodiment, a separate communications channel is provided between each VM of one compartment and each VM of the other compartment, i.e. between each tuple of VMs, and a pair of separate FIFOs implement each channel, allowing communications in each direction. Thus in the example of FIG. 3 there could be a total of 12 FIFOs.

A communications protocol is for example implemented for writing to the shared memory so as to avoid one virtual machine overwriting data before it has been read. Furthermore, communications from one compartment to the other are for example monitored and restricted by the monitor layer 410.

Alternatively, shared memory 406 may be formed of a plurality of sub-zones (not illustrated in FIG. 4A), each associated with a different virtual machine of the compartments 303 and 304. When a virtual machine wishes to communicate with a virtual machine of the other compartment, it for example writes to its associated sub-zone of the shared memory. In some embodiments, only certain virtual machines of the other compartment are permitted to access this memory sub-zone, such that access restriction can be implemented.

A monitor layer 410 of FIG. 4A, for example implemented by a TrustZone monitor, for example manages communications between virtual machines of different compartments, and controls the partitioning between the compartments 303, 304. For example, the monitor layer permits certain safety critical functions implemented by the compartment 304 to be securely isolated from the functions of the compartment 303. The compartment 303 is for example a non-secure environment vulnerable to malicious software threats.

Figure 4B:
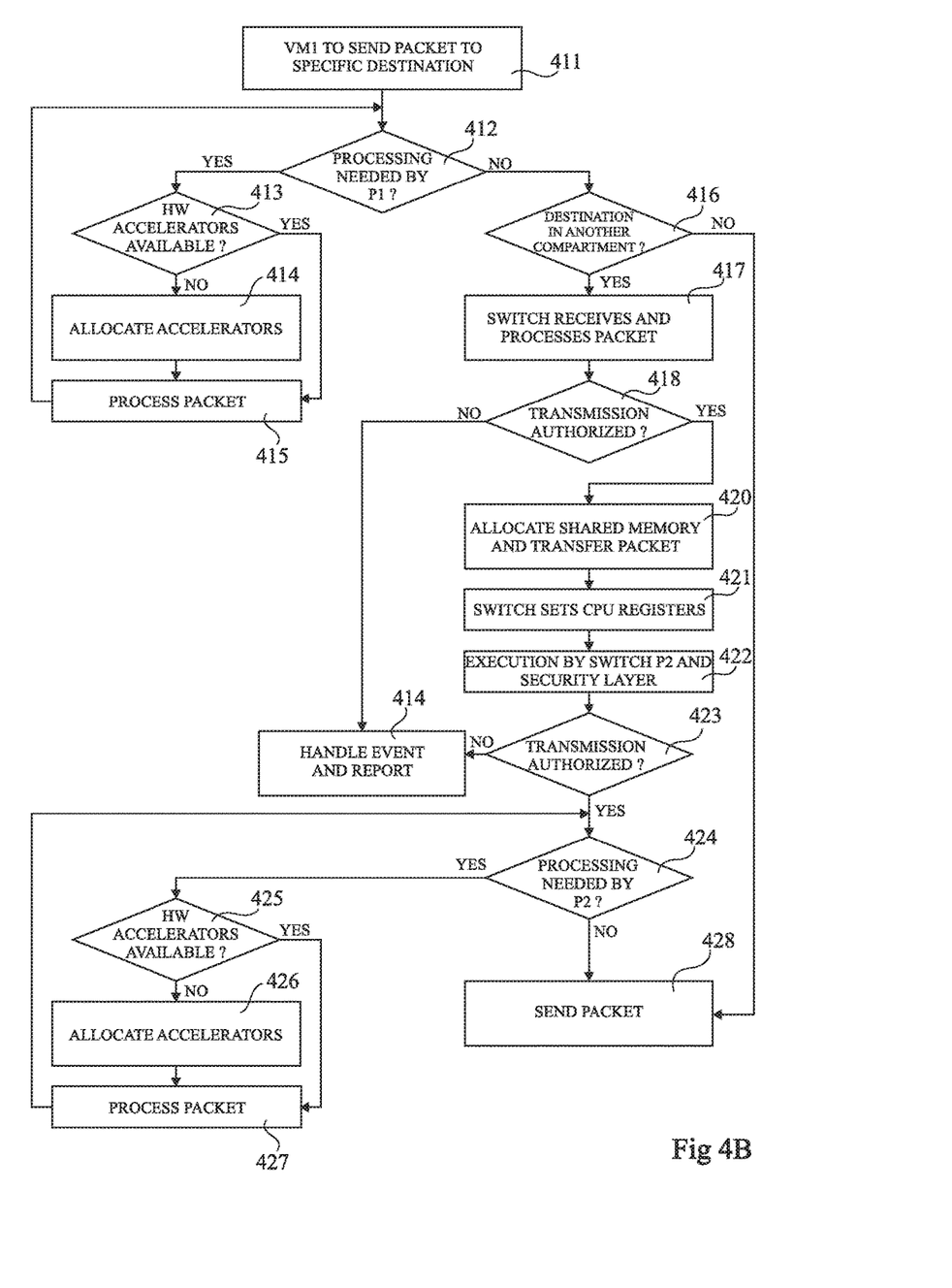
FIG. 4B is a flow diagram illustrating an example of operations in a method of communication between virtual machines according to an example embodiment of the present disclosure.

FIG. 4B is a flow diagram illustrating an example of operations in a method of communication between virtual machines. The operations of FIG. 4B are for example implemented by the virtual machines, virtual switch 302 and hardware accelerator circuit 310 of FIGS. 3 and 4.

At the start of the process, as represented by an operation 411, one of the virtual machines, for example VM1, wishes to send a packet to a specific destination, such as for example to the virtual machine VM t1.

In an operation 412, it is determined whether the packet needs to be processed by a module of the P1 sub-switch 402. For example, processing could include protocol conversion and/or encryption or decryption.

If processing is needed, in an operation 413, it is for example determined whether hardware accelerators of the circuit 310 are available to process the packet. If not, an FPGA accelerator is for example allocated. For example, the FPGA accelerator may first be configured by an appropriate bitstream, provided for example by the virtual sub-switch P1 402, in order to be able to perform the appropriate processing.

In an operation 415, the packet is then processed, which for example involves protocol conversion, encryption/decryption, etc. Operation 415 is also performed after operation 413 by a hardware accelerator if one is available.

After operation 415, the method returns to operation 412. When in operation 412 it is determined that no additional processing by the P1 sub-switch 402 is needed, the next operation is 416.

In operation 416, it is determined whether the packet destination is in another compartment of the same compute node. If so, in an operation 417, the sub-switch 402, 404 associated with the source VM for example receives the packet and analyses it, for example using a security manager (described in more detail below with reference to FIG. 5), before sending it to its destination. Alternatively, in some embodiments, operation 417 could be omitted to avoid the packet passing through the security manager twice, once in operation 417, and once in an operation 422 described below.

In an operation 418, it is determined, for example by the security manager, whether the packet is authorized to be transmitted to the destination. For example, this is based on whether the packet is secure and/or whether the source device is authorized to send packets to the destination. For example, the packet is authenticated, for example based on a message authentication code (MAC) associated with the packet. If the packet is not authorized to be transmitted, in an operation 419, the event is handled, for example by dropping the packet and/or resetting the virtual machine, etc. Alternatively, if in operation 418 it is found that the packet is authorized to be transmitted, a next operation is 420.

In operation 420, if not already done, a portion of the shared memory 406 is for example allocated by the sub-switch P1 402 to the stream, i.e. to the source and destination tuple. This allocation for example includes specific security settings, for example from the security manager, which could in some instances prevent the creation of certain communication channels. For example, a communication channel between a trusted VM, such as the VM t2, and one of the VMs VM1, VM2 or VM3 could be blocked by the security manager. The packet is then for example transferred to the shared memory 406.

In an operation 421, the sub-switch P1 then for example sets the CPU registers, by writing certain information to the CPU registers of the one or more processing cores implementing the compute node. For example, the sub-switch P1 calls the monitor layer 410 using an ARM secure monitor call (SMC) or the like, executed by a kernel driver (the name "ARM" is likely to correspond to a registered trademark). The sub-switch P1 for example writes information to the CPU registers to allow the monitor service handler of the monitor layer 410 to take a decision as to whether or not the message transmission should be prevented. For example, the sub-switch P1 writes to the CPU registers: the SMC service ID, defining the type of service that is requested; the identifier of the sending VM; and the identifier of the destination VM. The identities of the source and destination VMs for example allow the monitor layer to check if communication between these VMs is authorized. If authorization is not permitted, the monitor layer 410 is for example configured to abort the transaction. In some embodiments, the monitor layer 410 also for example restarts the sending VM, as the attempted communication could be the result of malicious software trying to access the secure world.

In some embodiments, the sub-switch P1 may write a code, such as a special authorization code, to the CPU registers that can be used by the monitor layer 410 to verify that the request was initiated by the virtual switch. For example, in this manner a virtual machine or other elements such one of the accelerators 310 is able to program the virtual switch so that it is capable of sending packets automatically. The special authorization code is for example a secret code known to the virtual switch and the monitor layer 410.

For example, a virtual machine may program the virtual switch to send packets over one of the networks at regular intervals, such as every 100 ms. In this case, the virtual switch for example stores the special authorization code in the CPU registers in order to inform the monitor layer 410 that the packet transmission has been initiated by the virtual switch and can be authorized.

As a further example, the virtual switch for example uses an accelerator of the circuit 310 to perform a task such as packet encryption or decryption, and the special authorization code is for example used to inform the monitor layer 410 that the resulting packets were initiated by the virtual switch and can be transmitted.

In an operation 422, execution of the sub-switch P2 404 is triggered, for example by the monitor layer 410, using for example an interrupt, polling, etc. The sub-switch P2 404 for example reads the packet from the shared memory 406 and passes it through the security layer provided by the security manager.

In a next operation 423 it is for example determined again whether the packet is authorized to be transmitted to the destination, in a similar fashion to operation 418. If not, operation 419 described above is for example executed. If the packet is authorized to be transmitted, the next operation is 424.

In operation 424, it is determined whether the packet needs to be processed by a module of the sub-switch P2 404. For example, processing could include protocol conversion and/or encryption or decryption.

If processing is needed, in an operation 425, it is for example determined whether hardware accelerators of the circuit 310 are available to process the packet. If not, an FPGA accelerator is for example allocated. For example, the FPGA accelerator may first be configured by an appropriate bitstream, provided for example by the virtual sub-switch P2 404, in order to be able to perform the appropriate processing.

In an operation 426, the packet is then processed, which for example involves protocol conversion, encryption/decryption, etc. Operation 426 is also performed after operation 425 by a hardware accelerator if one is available.

After operation 427, the method returns to operation 424. When in operation 424 it is determined that no additional processing by the P2 sub-switch 404 is needed, the next operation is 428 in which the packet is transmitted to the destination, for example by the sub-switch P2 404. Operation 428 is also for example performed after operation 416 if the destination virtual machine is not in another compartment, and in such a case the transmission can for example be performed without using the virtual switch 302.

Figure 5:
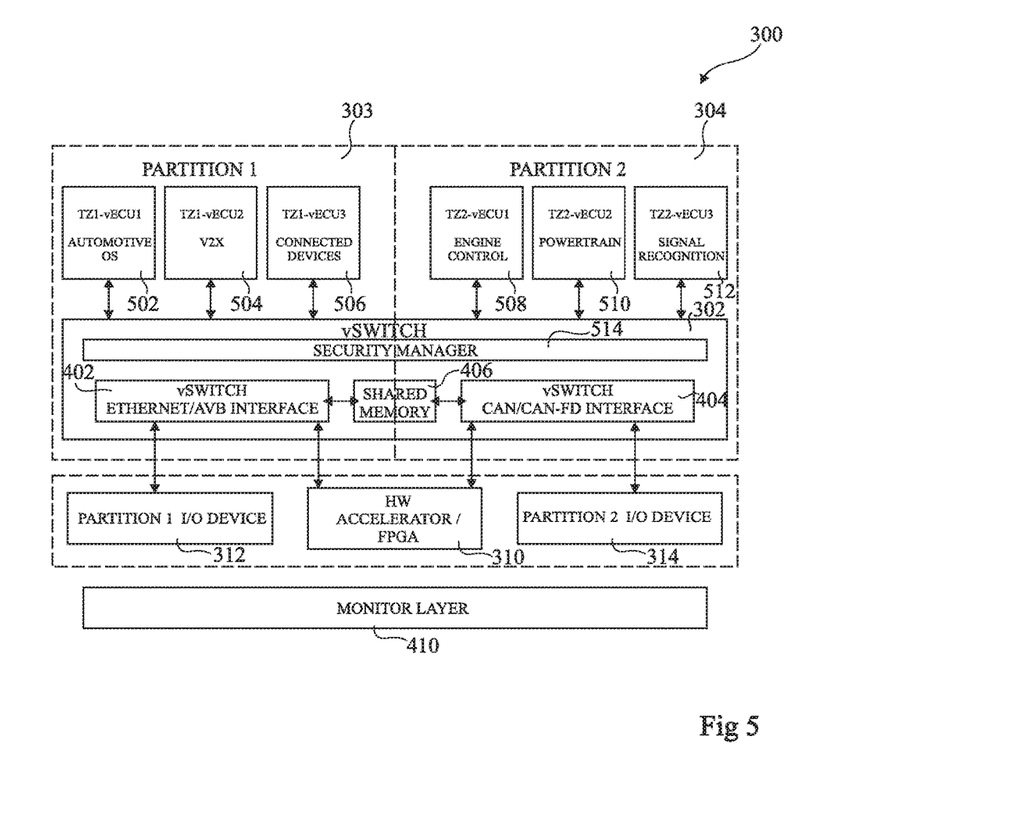
FIG. 5 schematically illustrates the multi-core processing system of FIG. 3 in more detail according to a further example embodiment of the present disclosure.

FIG. 5 schematically illustrates the multi-core processing system 300 of FIG. 3 in yet more detail according to an example in the system 300 is an automotive embedded system.

In the example of FIG. 5, the compartment 303 for example comprises a virtual machine 502 (TZ1-vECU1) implementing an ECU for running an automotive operating system, such as the automotive grade Linux IVI (in-vehicle infotainement), a virtual machine 504 (TZ1-vECU2) implementing an ECU for vehicle to vehicle communications (V2X) and a virtual machine 506 (TZI-vECU3) implementing an ECU for connected devices, for example permitting data to be passed to and from a smart phone, tablet computer, etc., for example via a wireless connection. The compartment 303 thus corresponds to relatively non-critical functions.

The compartment 304 for example comprises a virtual machine 508 (TZ2-vECU1) implementing an ECU for controlling an engine control module, a virtual machine 510 (TZ2-vECU2) implementing an ECU for controlling the powertrain, and a virtual machine 512 (TZ2-vECU3) implementing an ECU for providing signal recognition, which for example analyses one or more video streams captured outside a vehicle in order to automatically recognize road signs such as speed limits. The compartment 304 thus corresponds to safety critical functions.

The sub-switch 402 of the virtual switch 302 is for example dedicated to Ethernet and/or AVB communications, while the sub-switch 404 of the virtual switch 302 is for example dedicated to CAN and/or CAN-FD communications.

The virtual switch 302 also for example comprises a security manager 514. The security manager 514 for example performs message/packet authentication to verify that data originates from a trusted source and has not been corrupted. This may involve verifying, for example using one of the hardware accelerators 310, a MAC (message authentication code) and/or check-sum value forming part of the data packet/message. The security manager 514 for example includes security functions such as deep packet inspection, a firewall, etc. In some embodiments, the security manager 514 comprises a deep packet inspection module, and this module for example uses one or more hardware accelerators of the hardware accelerator circuit 310 in order speed up the packet inspection. A packet or message is only for example transmitted between the compartments via the virtual switch 302 if the verification is successful.

An example of operation of the system 300 of FIG. 5 will now be described with reference to FIG. 6.

Figure 6:
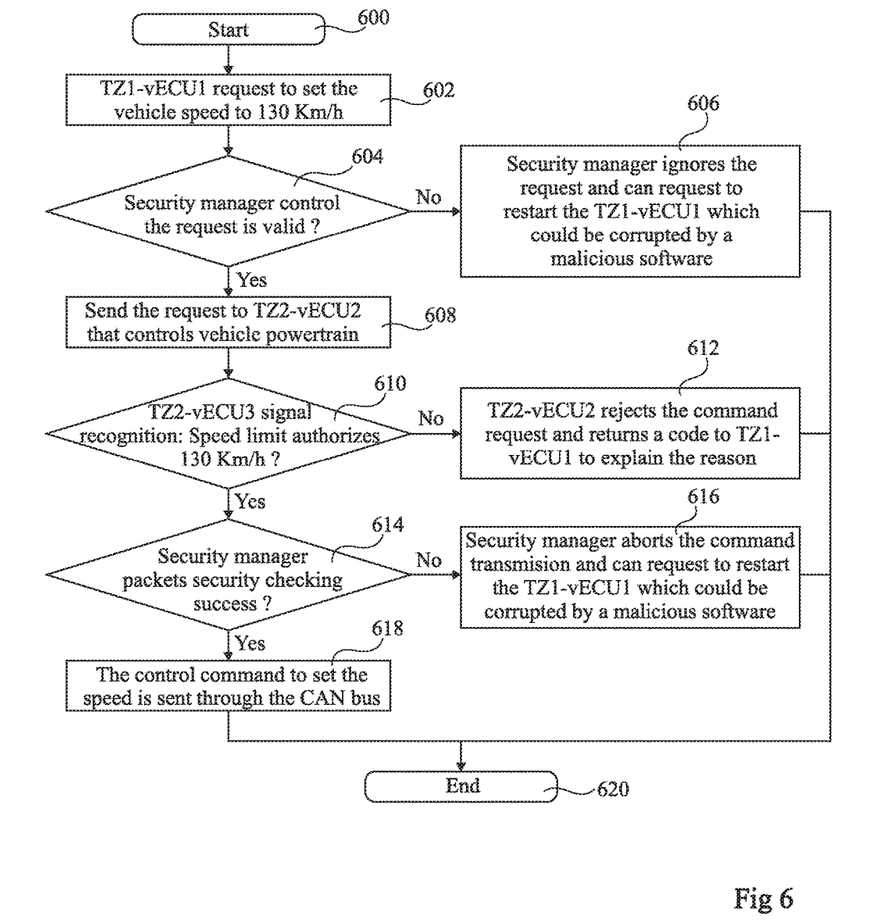
FIG. 6 is a flow diagram illustrating an example of operations in a method of communications via a virtual switch according to an example embodiment of the present disclosure.

FIG. 6 is a flow diagram representing operations in a method of adjusting the vehicle speed. More generally, the flow provides an example of communications between virtual machines in the different compartments 303, 304, and the CAN bus of network 315.

The process starts in an operation 600, and in an operation 602, the automotive operating system implemented by the virtual machine 502 for example requests that the vehicle speed is set 130 km/h. This request for example originates from a driver of the vehicle, who has for example activated the cruise control function in the vehicle.

In an operation 604, the security manager 514 for example determines whether the request is valid. For example, it determines whether such a request is permitted from the VM 502. If not, in an operation 606, the security manager 514 for example ignores the request to change the vehicle speed, and in some embodiments the security manager requests that the virtual machine 502 is restarted, as the request may result from the VM 502 being corrupted with malicious software. The process then ends at operation 620.

If the request is determined to be valid in operation 604, in a subsequent operation 608, the request is sent by the virtual switch 302 to the VM 510. This for examples a transfer of the request from the sub-switch 402 to the sub-switch 404 via the shared memory 406.

In an operation 610, the VM 512 for example determines whether, in view of road signs that have been recognized, the current speed limit permits a vehicle speed of 130 km/h. If not, in an operation 612, the VM 510 for example rejects the speed change request, a code is for example transmitted to VM 502 via the virtual switch to explain the reason, and the process ends at operation 620.

If in operation 610 the speed change is authorized based on signal recognition, a corresponding speed change command is for example generated by the VM 510, and in an operation 614, the security manager 514 for example verifies that the packet security check of this speed change command has been completed successfully. If not, in an operation 616, the security manager 514 for example causes the transmission of the speed change command to be aborted, and in some embodiments the security manager requests that the virtual machine 502 is restarted, as the request may result from the VM 502 being corrupted with malicious software. The process then ends at operation 620.

If the packet security verification in operation 614 is successful, in an operation 618 the speed control command is for example sent to the powertrain via input/output interface 314 and the CAN bus of network 315 to cause the vehicle speed to be changed. The process then ends at operation 620.

It will be apparent to those skilled in the art that while the flow of FIG. 6 is based on an example in which the request relates to a change of speed, a similar flow could be applied to any type of request between virtual machines in different compartments.

An advantage of the embodiments described herein is that, by using a virtual switch, a hardware partition can be implemented between compartments of a compute node, and different communications protocols can be supported by each of these compartments. This means for example that a protocol adapted for high data rate communications, such as Ethernet, can be used by one compartment, while a different secure and reliable protocol such as CAN can be used by the other compartment, and communications between the compartments is still possible.

Having thus described at least one illustrative embodiment, various alterations, modifications and improvements will readily occur to those skilled in the art. For example, it will be apparent to those skilled in the art that, while the specific application of automotive embedded systems has been described, the embodiments described herein could have many further applications. For example, the embodiments described herein could be applied to network functions virtualisation in communications networks, where real-time 5G antenna services are executed in compartment 304 and virtual network functions, such as routers, firewalls, etc., are executed in compartment 303.

Furthermore, it will be apparent to those skilled in the art that the various features described in relation to the various embodiments could be combined, in alternative embodiments, in any combination. For example, the hardware devices 216 described in relation with FIG. 2 could be incorporated in the compartment 303 or the compartment 304 of FIG. 3 to provide further hardware acceleration.

The invention claimed is:

1. A multi-core processing system comprising:
a first input/output interface configured to transmit data over a first network based on a first network protocol;

a second input/output interface configured to transmit data over a second network based on a second network protocol;
a plurality of processing cores;
one or more hardware accelerators coupled to the first and second input/output interfaces; and
one or more memory devices storing software enabling virtual processing resources of the plurality of processing cores and virtual memory to be assigned to support:
a first compartment implementing one or more first virtual machines;
a second compartment implementing one or more second virtual machines; and
a programmable virtual switch configured to provide an interface between the first and second virtual machines and the first and second input/output interfaces, wherein:
the programmable virtual switch comprises:
a shared memory permitting communications between the first and second virtual machines;
a first compartment switch providing an interface between the one or more first virtual machines and the first input/output interface and/or the one or more hardware accelerators; and
a second compartment switch providing an interface between the one or more second virtual machines and the second input/output interface and/or the one or more hardware accelerators, wherein the first and second compartment switches are configured to communicate via the shared memory; and
the programmable virtual switch is further configured to dynamically allocate the one or more hardware accelerators for use by the first or second virtual machines, wherein:
the first compartment switch is configured to access the shared memory only during the first compartment execution; and
the second compartment switch is configured to access the shared memory only during the second compartment execution.

2. The multi-core processing system of claim 1, wherein the shared memory comprises a common area for the first and second virtual machines to read and write data packets.

3. The multi-core processing system of claim 1, wherein the shared memory comprises a plurality of sub-regions, a different sub-region being associated with each of the first and second virtual machines, wherein the programmable virtual switch is configured to deny read/write access to at least one of said sub-regions by at least one of said first and second virtual machines.

4. The multi-core processing system of claim 1, wherein the programmable virtual switch further comprises a security manager configured to perform packet authentication of data packets transmitted and/or received by the first and/or second virtual machines.

5. The multi-core processing system of claim 1, wherein the virtual switch is adapted to write a special authorization code to one or more registers associated with the one or more processing cores, the special authorization code indicating that the packet transmission is initiated by the virtual switch, wherein a monitor layer is configured to authorize the packet transmission based on the special authorization code.

6. The multi-core processing system of claim 1, wherein the first network is one or more of:
an Ethernet network
an AVB (audio video bridging) network;
an MOST (media oriented systems transport) network, and the second network is one or more of:
a CAN (controlled area network); and
a CAN-FD (controlled area network with flexible data rate).

7. A method of communication comprising:
providing a virtual processing system comprising a plurality of processing cores, and one or more memory devices storing software enabling virtual processing resources of the plurality of processing cores and virtual memory to be assigned to support a first compartment implementing one or more first virtual machines, a second compartment implementing one or more second virtual machines, and a programmable virtual switch;
routing, by the programmable virtual switch, first data from one of the first and second virtual machines to one or more of:
another of the first and second virtual machines;
a first input/output interface configured to transmit data over a first network based on a first network protocol; and
a second input/output interface configured to transmit data over a second network based on a second network protocol, wherein the first data is routed to the first or second input/output interface via one or more hardware accelerators, the method further comprising dynamically allocating, by the programmable virtual switch, the one or more hardware accelerators for transmitting data over the first or second network, wherein:
the programmable virtual switch comprises:
a shared memory permitting communications between the first and second virtual machines;
a first compartment switch providing an interface between the one or more first virtual machines and the first input/output interface and/or the one or more hardware accelerators; and
a second compartment switch providing an interface between the one or more second virtual machines and the second input/output interface and/or the one or more hardware accelerators;
the first and second compartment switches are configured to communicate via the shared memory;
the first compartment switch is configured to access the shared memory only during first compartment execution; and
the second compartment switch is configured to access the shared memory only during second compartment execution.

8. The method of claim 7, wherein the first data is routed from one of the first virtual machines to one of the second virtual machines via:
the first compartment switch accessible by the one or more first virtual machines;
the second compartment switch accessible by the one or more second virtual machines; and
the shared memory accessible by the first and second compartment switches.

9. A non-transitory computer readable medium storing computing instructions adapted to implement, when executed by a processing device, the method of claim 7.

* * * * *